United States Patent
Dammann et al.

[11] Patent Number: 6,129,629
[45] Date of Patent: Oct. 10, 2000

[54] INTAKE ZONE FOR AXIAL SEPARATOR

[75] Inventors: Martin Dammann; Franz Heidjann; Bodo Kühn, all of Harsewinkel, Germany

[73] Assignee: CLAAS Selbstfahrende Erntemaschinen GmbH, Harsewinkel, Germany

[21] Appl. No.: 09/448,788

[22] Filed: Nov. 24, 1999

Related U.S. Application Data

[63] Continuation of application No. PCT/EP98/03102, May 26, 1998.

[30] Foreign Application Priority Data

May 27, 1997 [DE] Germany ............... 197 22 079

[51] Int. Cl.$^7$ ........................................... A01F 12/18
[52] U.S. Cl. ................. 460/67; 460/69; 460/80
[58] Field of Search ................. 460/70, 66, 67, 460/68, 69, 77, 80, 113, 119

[56] References Cited

U.S. PATENT DOCUMENTS

| | | | |
|---|---|---|---|
| 4,148,323 | 4/1979 | McMillen et al. | 460/70 |
| 4,291,709 | 9/1981 | Weber et al. | |
| 4,611,605 | 9/1986 | Hall et al. | 460/80 |
| 5,145,462 | 9/1992 | Tanis et al. | |
| 5,257,959 | 11/1993 | Tanis | 460/68 X |
| 5,445,563 | 8/1995 | Stickler | 460/69 |
| 5,688,170 | 11/1997 | Pfeiffer et al. | 460/80 X |

FOREIGN PATENT DOCUMENTS

| | | |
|---|---|---|
| 0 244 862 | 11/1987 | European Pat. Off. |
| 0 591 688 | 4/1994 | European Pat. Off. |
| 0 631 716 | 1/1995 | European Pat. Off. |
| 2 525 429 | 10/1983 | France. |
| 2 048 892 | 4/1971 | Germany. |

*Primary Examiner*—H. Shackelford
*Attorney, Agent, or Firm*—Husch & Eppenberger, LLC; Robert E. Muir

[57] ABSTRACT

The present invention describes an intake zone (4a) for an axial separator (4) consisting of a rotor (6) that is configured as a cone in its front area, is tapered in the direction of the flow of materials and has a sleeve (12, 13, 16) or an intake zone for a similar axial flow threshing and separating device having at least one similar separating rotor (6) arranged downstream from a single or multi-cylinder threshing machine with a feed cylinder (3) connected thereto. The upper sleeve (12) of the intake zone (4a) has a semi-circular cross-section at the beginning of the rotor intake continuously running as far as the end of the intake zone (20) into an eccentric cross-section corresponding to the cross-section of the remaining upper sleeve. The spiral-shaped base bodies (10) of the cylindrical rotor intake (5) are staggered in relation to each other and are provided with interchangeable spiral-shaped wearing parts, the height of which decreases in the direction of the end of the intake zone (20) in such a way that a conical enveloping surface arises.

7 Claims, 3 Drawing Sheets

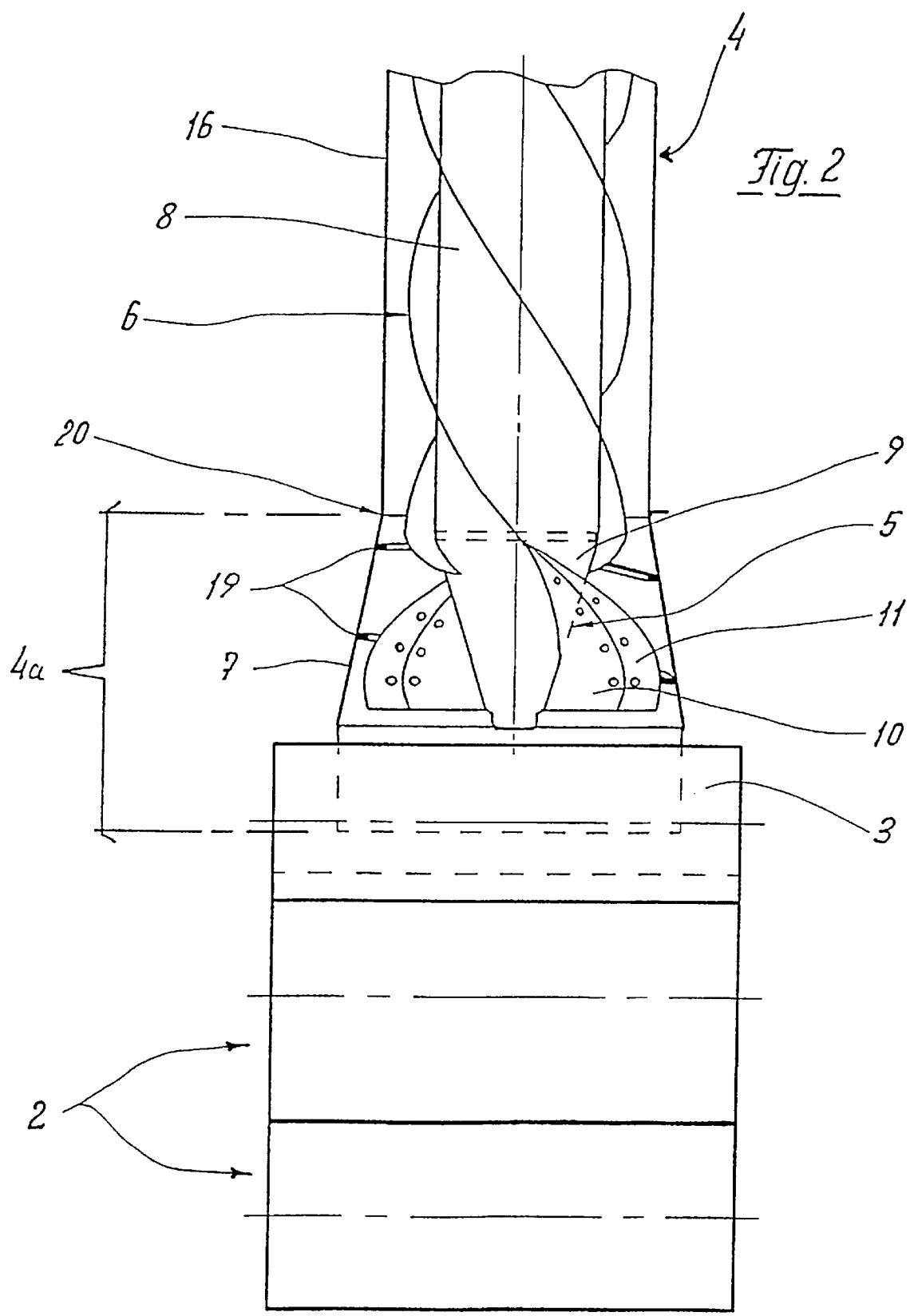

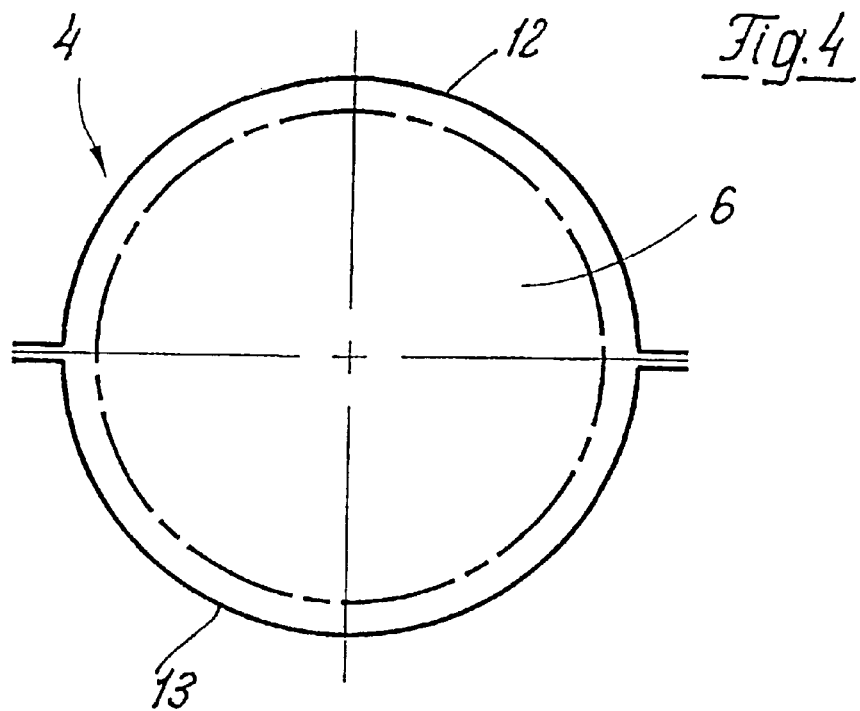
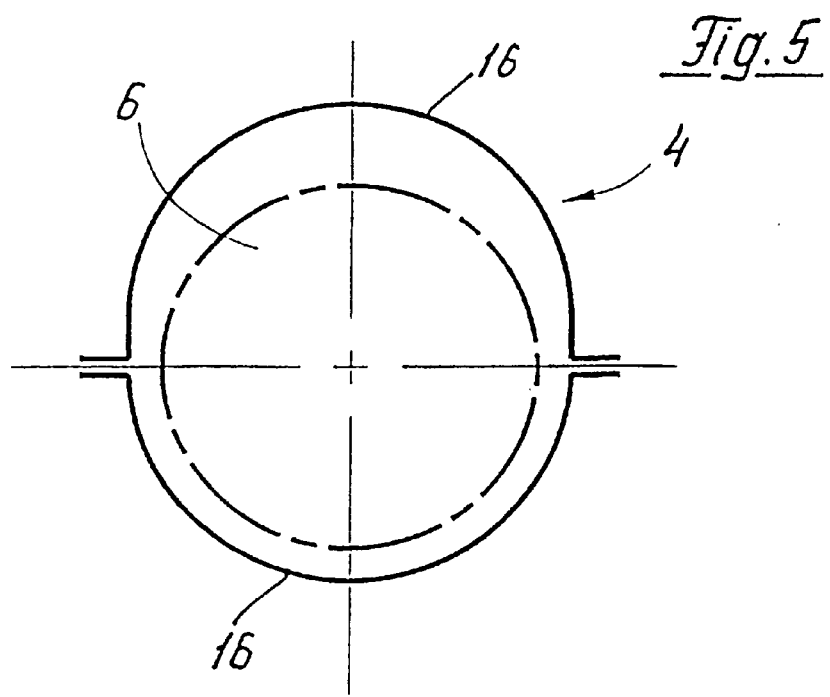

INTAKE ZONE FOR AXIAL SEPARATOR

This application is a continuation of PCT Application No. PCT/EP98/03102 filed May 26, 1998 and which named the United States as a designated country.

The present invention relates to a conically tapering intake zone having a continuously matched intake housing for an axial-flow threshing and dividing mechanism, or, for an axial separator. In a combine harvester, at least one such axial separator is arranged downstream of a single or multi-cylinder type tangential threshing mechanism and its feed drum.

Problems, relating to the transportation of materials in the transfer zone between the tangentially functioning feed rake shaft i.e. the above mentioned single or multi-cylinder threshing mechanism with its attached feed drum, and the axial onward path extending at right angles thereto in the known axial-flow threshing and dividing assemblies or axial separators, have led to very many differing designs for the intake zones to the rotors and the claddings thereof.

In the case of parallel axis, double rotors having a cylindrical intake zone, it is known from EP 0 244 862 to provide trapezoidal and conical extensions to the upper half-shell of the rotor cladding in the intake zone. In order to ensure trouble-free pick up and distribution of the tangentially supplied material in the intake zone of the rotors, these trapezoidal or conical extensions are designed such that they extend over both rotors at the start of the intake zone and then, at the end thereof, taper such that the edge-sections of these extensions are aligned with the remainder of the rotor cladding when viewed from above and coincide centrally between the two rotors at the end of the intake zone. Trouble-free pick up of the material in the intake zone is thereby achieved but only at the expense of a very complicated and hence cost intensive manufacturing process for the rotor cladding. Moreover, due to the large amount of space in the upper part of the intake zone between the feeder members on the rotors and the rotor cladding and as a result of a lack of conveying or advancing mechanisms, it is necessary to have an appropriately high bulk factor of material in this upper region so as to ensure that the material will be transported properly even though it is beyond the effective range of the pusher members.

In addition, in the case of axial-flow type combine harvesters, it is known to use one and two rotor assemblies which are provided at their front ends with conically tapering wing-like or helical elements which are encased by conical intake housings. This form of construction is intended to provide positive pick up and distribution of the material as well as a reduction in the breadth of the stream of material issuing from the feed rake shaft to match the diameter of the rotor. However, this type of axial-flow combine harvester suffers from the substantial disadvantage of the step-like transition between the intake zone and the threshing and dividing zone in the upper or lower parts of the rotor cladding. The stratification processes occurring in these regions lead to an increase in the power requirements.

In regard to the enlarged spacing between the threshing and dividing rotors of the axial-flow combine harvester and the upper half-shells of the rotor claddings, it is known from EP 0 631 716 to employ spacer rails which are inserted between the upper and lower half-shells. Apart from the high assembly costs, the disadvantages of this concept lie in the positioning of the separate spacer rails, which are of different shapes in the threshing and dividing zones, in the stepped inner wall of the rotor cladding where the conditions are particularly unfavorable as described above.

An object of the invention is to provide a design for the intake zone of axial-flow threshing and dividing rotors or of axial separators which adds to the full functional capabilities thereof.

In accordance with the invention, this object is achieved in that the crosssection of the single or multi-part upper casing for the intake zone is semi-circular at the beginning of the inlet to the rotor and changes over the length of the zone so that at the end thereof it then corresponds to the eccentric cross-section of the remainder of the upper casing. The result of this arrangement is that the compressed material is separated in the upper, non-separating space between the rotor and the cladding, and the friction between the material and the upper casing of the intake zone is reduced. Moreover, the stepless transition from the intake zone to the threshing or dividing zone prevents the unfavorable, highly energetic stratification and turbulence effects.

The helical pusher elements at the beginning of the conical rotor have a two-part construction so as to enable the rotor to be removed from the rear wall of the combine harvester opposite the feed mechanisms with little effort. The helical base members connected to the rotor are designed such that a cylindrical rotor core is formed at the beginning of the rotor, the diameter of the envelope of this cylinder being no greater than that of the remainder of the rotor. The helical base members are provided with interchangeable wear-resistant elements that are also in the form of a helix whose height reduces from the start of the rotor up to the end of the intake zone. This form of construction results in the initial part of the rotor having a conical shape which tapers in the direction of flow of the materials and thereby improves the pick up of these materials.

In order to improve the transportation of the materials in the intake zone of a threshing and dividing rotor or of an axial separator rotor, the upper section of the cladding for the intake zone is provided with a plurality of guide rails on its inner surface, said rails extending helically in the direction of flow of the materials and the height thereof increasing by the same amount as the diameter of the envelope of the initial part of the rotor decreases so that the spacing between the upper edges of the guide rails and the wear-resistant elements remains constant and low throughout the whole of the upper section of the intake zone. In known manner, the inner face of the lower cladding for the intake zone is also provided with guide rails for maintaining a constant flow of materials, the height of these rails remaining constant however.

The lower unhingeable section of the casing for the intake zone is provided with openings for separating loose grains dispersed in the layer of material whilst they are still in the intake zone so as to thereby reduce the load, in dependence on the construction of the rotor, in the following threshing and dividing zone.

An embodiment of the invention will be explained in detail hereinafter with the help of the drawings wherein:

FIG. 2 is a top view of an axial separator incorporating the intake zone in accordance with the invention but without the upper casing for this zone.

FIG. 4 is a schematic illustration of the cross-section of the rotor and its cladding at the beginning of the intake zone along the section line IV—IV in FIG. 1.

FIG. 5 is a schematic illustration of the cross-section of the rotor and its cladding at the end of the intake zone along the section line V—V in FIG. 1.

Figure 1:
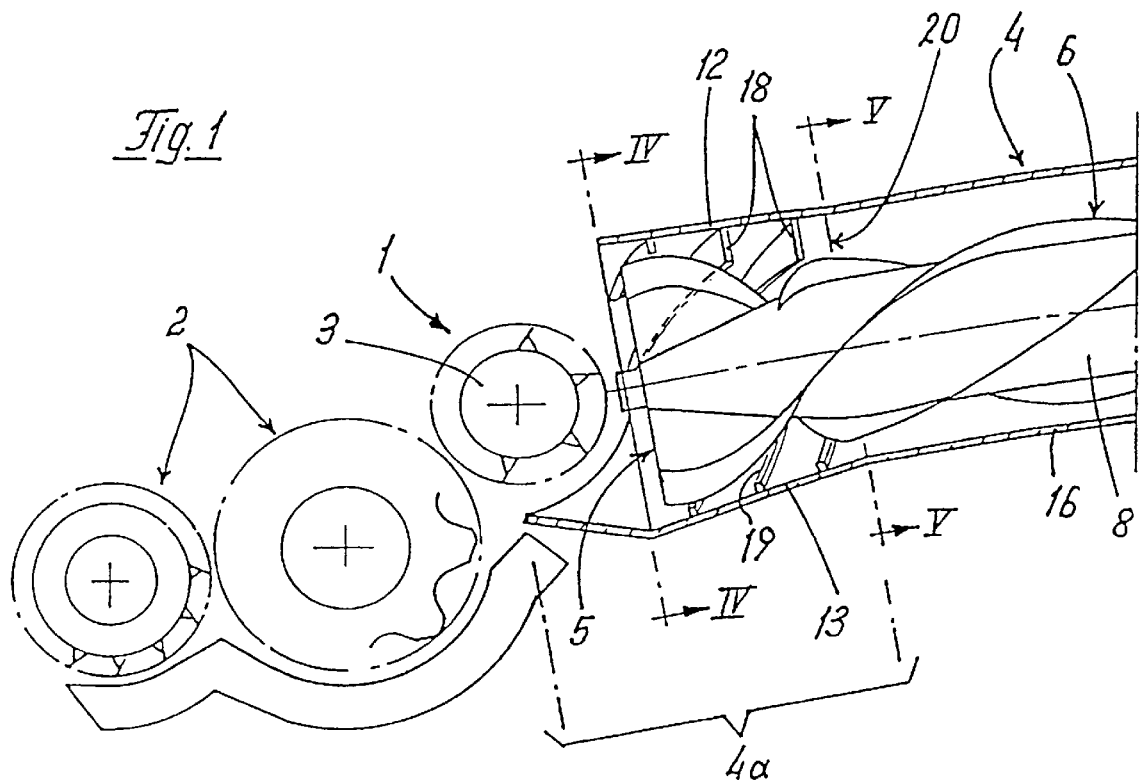
FIG. 1 is a side view of a section of a combine harvester having a multicylinder threshing mechanism, a feed drum and a following axial separator incorporating an intake zone in accordance with the invention.

A partial view of a not particularly described combine harvester 1 illustrated in FIG. 1 shows that it is equipped with a likewise not particularly described two cylinder tangential threshing mechanism 2, a feed drum 3 and a following axial separator 4 incorporating an intake zone 4a in accordance with an embodiment of the invention. Any tangential threshing mechanism of the single or multi-cylinder type may be employed in place of the two cylinder tangential threshing mechanism 2 used in this embodiment.

The axial separator 4 is fixed, in a not particularly described manner, in the combine harvester such that its position relative to the feed drum 3 cannot be altered.

The intake zone 4a (FIG. 2) of the axial separator 4 is comprised by a rotor inlet 5 of a separator rotor 6 in accordance with an embodiment of the invention and of a unique cladding 7 for the intake zone, both of which will be described in detail hereinafter.

A core tube 8 of the separator rotor 6 has a cylindrical cross-section. In the intake zone 4a, it is provided with an extension piece 9 in the form of a frustum of a cone whose greater diameter, at the end of the intake zone 4a, corresponds to that of the core tube 8. Two helical base members 10, which are relatively displaced through 180°, are welded to the peripheral surface of the truncated cone shaped extension piece 9. The height of these members decreases in proportion to the increase in radius of the extension piece 9. This creates a cylindrical start for the rotor having an envelope diameter which is no greater than that of the remainder of the separator rotor 6. In accordance with an embodiment of the invention, helical wear-resistant pieces 11 are bolted onto the helical base members 10. Their height decreases over the length from the start to the end of the base members 10 and this thereby creates the conically tapering shape of the rotor inlet 5 in the direction in which the material flows.

The cladding 7 for the intake zone (FIG. 3) is comprised by upper and lower casings 12, 13 in accordance with an embodiment of the invention, which will be described in detail hereinbelow, together with a material pick up head 14 and an adapting flange 15. The upper casing 12 is designed such that, at the start of the intake zone 4a, it has a circular cross-section which is aligned with the upper half-shell of the cladding for a separator zone 16 (FIG. 4). From there, its cross-section continuously alters until, at the end of the intake zone 5, it matches the eccentric cross-section of the upper half-shell of the cladding for the separator zone 16 (FIG. 5). The semi-circular front end of the upper casing 12 is welded to the material pick up head 14 whilst its eccentric rear end is welded to the adapting flange 15.

The lower casing 13 is semi-circular and its cross-section decreases conically towards an end 20 of the intake zone. This casing consists of thin-walled plates incorporating regularly or irregularly dispersed openings which may be of any shape in addition to the type of hole 17 shown in this embodiment. The lower casing 13 is hung in not-illustrated grooves in the upper casing 12 by means of not-illustrated chip-like elements and releasably connected over the remainder of its periphery to the material pick up head 14, the adapting flange 15 and the other side edge of the upper casing 12, although this too is not illustrated. In known manner, the inner surface of the lower casing facing the rotor inlet 5 is provided with guide rails 19 although these will not be described in detail.

The upper casing 12 of the intake zone 4a is provided with a plurality of guide rails 18 extending helically in the direction of material flow on the inner surface thereof facing the rotor inlet 5. The height of these rails increases towards the end 20 of the intake zone by the same amount as the reduction in radius of the envelope of the conical rotor inlet 5.

The cladding 7 for the intake zone is releasably connected via the adapting flange 15 to the cladding around the separator zone 16. Moreover, the material pick up head 14 of the intake zone cladding 7 is reinforced in not particularly described manner so as to provide the front mounting for the separator rotor 6 through the intermediary of a retaining stay 21 releasably attached to the upper part thereof.

Figure 3:
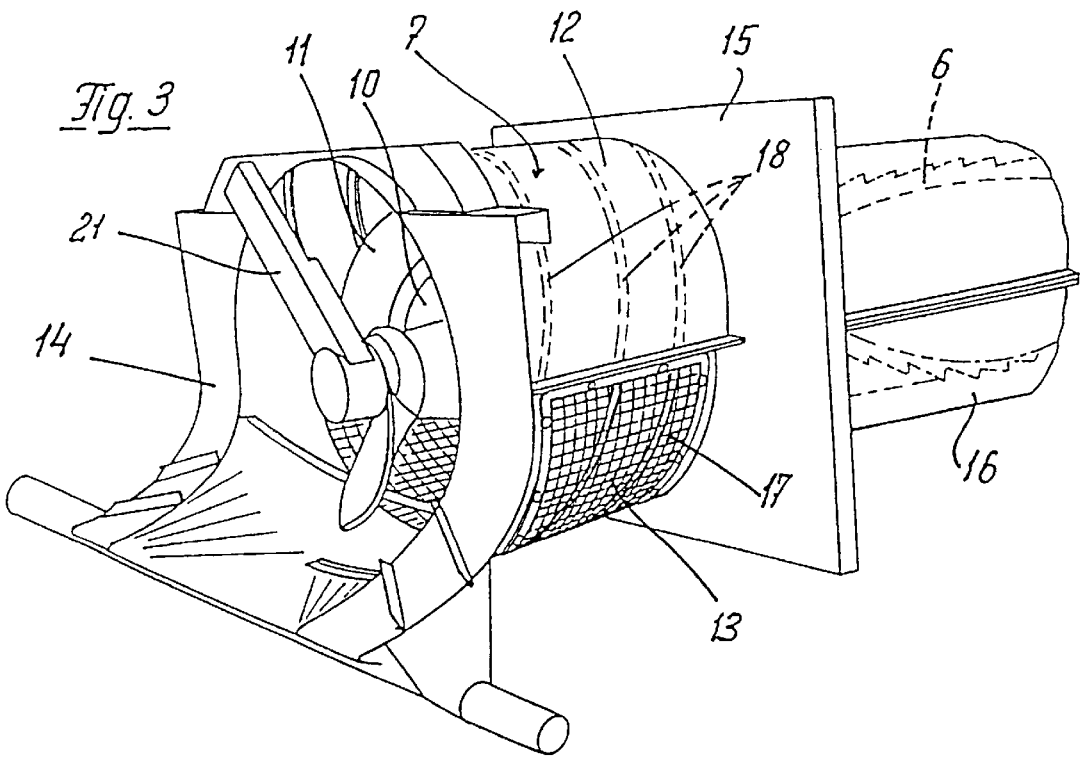
FIG. 3 is a perspective view of the intake zone in accordance with the invention based on the example of an axial separator.

The embodiment illustrated in FIGS. 1 to 3 is concerned with an advantageous design for the intake zone of an axial-flow threshing and separating assembly or of an axial separator in a combine harvester. However, the concept described hereinabove may be transferred without difficulty to systems in other fields of application by the skilled person.

What is claimed is:

1. An axial separator comprising a rotor having an inlet and a casing having an intake zone and a downstream zone, the intake zone being conical at an inlet thereof and convering in a direction of flow of material, wherein the casing of the downstream zone has an eccentric cross-section, and wherein a cross-section of the casing (12) for the intake zone (7) is penerally circular at the inlet (5) of the rotor and converges to a downstream end (20) of the intake zone adjacent the downstream zone where the cross-section of the in1ake zone corresponds to the eccentric cross-section of the casing of the downstream zone.

2. An axial separator having an intakc zone as in claim 1, including mutually displaced helical base members (10) of the rotor inlet (5), the base members being provided with interchangeable wear-resistant helical parts whose height reduces toward the downsteam end (20) of the intake zone to produce a conical envelope surface.

3. An axial separator having an intake zone as in claim 1, including a lower semi-includes thin-walled plates.

4. An axial segarator haing an intake zone as in claim 3, wherein the lower section (13) of the casing for the intake zone (4a) is provided with cut-outs at regular or irregular intervals.

5. An axial separator having an intake zone as in claim 4, wherein thes cut-uuts have different shapes.

6. An-axial separator having an intake zone as in claim 1, including an upper casing (12) for the intake zone (4a), the upper casing being provided with a plurality of guide rails (18) on an inner surface facing the rotor inlet (5), said rails extending helically in the direction of flow of the material and the height thereof increasing toward the downstream end (20) of the intake zone by the same amount as the radius of the envelope of the conical rotor inlet (5) decreases.

7. An axial separator having an intake zone mild a downstream zone and comprising a rotor and a sing having upper and lower parts, wherein said rotor is conical at a front end thereof and converges in a direction of flow of material, and wherein a cross-section of the upper part of the casing for the intake zone is semicircular at the inlet of the rotor and converges to a downstream end of the intake zone where the cross-section of the upper part of the casing for the intake zone corresponds to an eccentric cross-section of the upper casing of the downstream zone.

* * * * *

UNITED STATES PATENT AND TRADEMARK OFFICE
CERTIFICATE OF CORRECTION

PATENT NO. : 6,129,629
DATED : October 10, 2000
INVENTOR(S) : Martin Dammann, Franz Heidjann and Bodo Kuhn It is certified that error appears in the above-identified patent and that said Letters Patent is hereby corrected as shown below:

<u>Column 4,</u>
Line 27, delete "penerally" and insert -- generally --
Line 30, delete "i1ake" and insert -- intake --
Line 40, delete "segarator haing" and insert -- separator having --
Line 45, delete "thes cut-uuts" and insert -- the cut-outs --
Line 54, delete "mild" and insert -- and --
Line 55, delete "sing" and insert -- casing --

Signed and Sealed this

Twenty-eighth Day of January, 2003

JAMES E. ROGAN
*Director of the United States Patent and Trademark Office*